United States Patent [19]

Zeller, III et al.

[11] Patent Number: 5,034,211
[45] Date of Patent: Jul. 23, 1991

[54] REDUCING TURBIDITY IN CHROMIC ACID SOLUTIONS

[75] Inventors: Robert L. Zeller, III, Youngstown; Russell J. Morgan, Grand Island, both of N.Y.; Gilbert D. Rabbe, Carrollton, Tex.; Donna R. Fiscus, Hampstead; Richard L. Wilkes, Jr., Wilmington, both of N.C.

[73] Assignee: Occidental Chemical Corporation, Niagara Falls, N.Y.

[21] Appl. No.: 604,295

[22] Filed: Oct. 29, 1990

[51] Int. Cl.$^5$ ............................................. C01G 37/033
[52] U.S. Cl. .................................... 423/607; 210/758; 210/766; 423/53
[58] Field of Search .................. 423/607, 53, 658.5; 210/758, 766

[56] References Cited

U.S. PATENT DOCUMENTS

| | | | |
|---|---|---|---|
| 2,034,256 | 3/1936 | Vetter | 423/607 |
| 2,993,756 | 7/1961 | Marlatt et al. | 423/607 |
| 4,431,625 | 2/1984 | Marshall et al. | 423/607 |

FOREIGN PATENT DOCUMENTS 934105  8/1963  United Kingdom ............... 423/607

OTHER PUBLICATIONS

Kirk-Othmer, "Encyclopedia of Chemical Technology", Wiley and Sons, N.Y., 3rd ed., vol. 6 p. 95.
J. P. Mellor, *A Comprehensive Treatise on Inorganic and Theoretical Chemistry*.

*Primary Examiner*—Michael L. Lewis
*Assistant Examiner*—Brian M. Bolam
*Attorney, Agent, or Firm*—James F. Tao; Richard D. Fuerle

[57] ABSTRACT

Disclosed is a method of reducing the turbidity of an aqueous solution of chromic acid which is formed by dissolving melted chromic anhydride in water. The chromic anhydride is contacted with water in an amount in excess of 0.02 wt %, but insufficient to form a solution, at a temperature above ambient but below about 196° C. The water may be in the form of a liquid, water vapor, or steam. When the chromic anhydride is subsequently dissolved in water, the solution is much less turbid than it otherwise would be.

20 Claims, No Drawings

REDUCING TURBIDITY IN CHROMIC ACID SOLUTIONS

BACKGROUND OF THE INVENTION

This invention relates to a method of reducing the turbidity of an aqueous chromic acid solution. Specifically, it relates to the treatment of chromic anhydride by adding of a small amount of water and heating, which reduces turbidity in a solution of the chromic anhydride.

In one process for producing chromic anhydride, sodium dichromate is reacted with excess sulfuric acid in water to produce a precipitate of the chromic anhydride: $Na_2Cr_2O_7 + H_2SO_4 \rightarrow CrO_3 \downarrow$. The chromic anhydride is collected and is heated to form a melt with the molten chromic anhydride on the bottom and sodium bisulfite and other impurities on top. The chromic anhydride is separated from the melt and is poured onto a water-cooled flaker roll. The melt solidifies on the flaker roll, forming a thin sheet which is removed by a doctor blade and is broken up into flakes.

When the flakes of chromic anhydride are dissolved in water, a solution of chromic acid forms: $CrO_3 + H_2O \rightarrow H_2CrO_4$. Frequently, the chromic acid solution is turbid. Turbidity is undesirable because it affects the aesthetic qualities of aqueous products produced from chromic acid and, in turn, products produced from those solutions. While the turbidity seems to disappear after a period of time, it is not cost effective to permit the solution to sit for the time required for the desired reduction in turbidity.

SUMMARY OF THE INVENTION

We have discovered that the turbidity of a chromic acid solution prepared from melted chromic anhydride can be significantly and substantially reduced if the chromic anhydride is contacted with a small amount of water at a temperature between ambient and 196° C. It is surprising that this simple step, seemingly unrelated to turbidity, would nevertheless have an effect on the turbidity of a subsequently formed solution of the chromic anhydride.

DESCRIPTION OF THE INVENTION

The invention applies to any chromic anhydride that has been melted. Apparently, whatever is causing the turbidity is produced during melting because crude chromic anhydride solubilized prior to the melting step does not produce turbid solution. The chromic anhydride to be treated according to the process of this invention should be in particulate form and is typically a flake about 0.1 cm thick and about 1 cm$^2$ in area. Such flakes are typically produced on a flaker roll, but other solidification techniques such as pastillation or prilling could also be used. The water used to treat the chromic anhydride may be in any form, such as liquid water, water vapor, or steam.

The amount of water mixed with the chromic anhydride is critical, as insufficient water will not reduce turbidity. The amount of water required to reduce turbidity is at least about 0.02 wt%, based on the weight of the chromic anhydride being treated. While excess water will not adversely affect turbidity, more than about 0.2 wt% water may cause some caking of the chromic anhydride, necessitating regrinding, but, in any case, the amount of water used must be insufficient to solubilize the chromic anhydride. Preferably, the amount of water is about 0.05 to about 0.1 wt%.

The temperature at which the chromic anhydride is exposed to the water also affects the resulting turbidity of the solution of the chromic anhydride. Some heating above room temperature is required to reduce the treatment time, but the temperature should not exceed about 196° C., the melting point of chromic anhydride. At lower temperatures within that range turbidity is still reduced, but a longer contact time with the water is required. However, while higher temperatures are faster, they may also result in some caking of the chromic anhydride or reduction of the chromic anhydride to trivalent chromium. If liquid water is used the temperature is preferably about 65° C. to 196° C., and is most preferably about 90° to about 120° C. If steam is used the steam should not be superheated above 196° C. and, if water vapor is used, it should not be mixed with impure air as impure air may contain substances that will reduce the chromium to trivalent chromium.

The completion of the process can be determined by experimentally testing samples at different times and temperatures. The treatment normally requires about two to three hours if the temperature is about 106° C. When the treated chromic anhydride is subsequently dissolved in water, the resulting chromic acid solution will be of lower turbidity.

The following examples further illustrate this invention.

EXAMPLE 1

Thirty-six 50 g chromic anhydride samples were placed in jars and the jars were positioned in random order to eliminate bias due to sample preparation. The jars were heated in an oven at 106° C. for one hour. To all of the jars except for the control different amounts of water were added. The jars were heated again at different times and temperatures. Fifteen minutes was required to sort, add water, and put samples in correct places. The turbidity, in Nephelos Turbidity Units (NTU), was then measured by dissolving a 1 g sample in 100 mL distilled water (which had an NTU of 0.05). Within two minutes the samples were tested using a Hach Turbidometer vial. The following table gives the results (in NTU):

| | (°C.) | | | | | | |
| --- | --- | --- | --- | --- | --- | --- | --- |
| | 106 | 66 | 25 | 106 | 66 | 25 | |
| | | | | (% H$_2$O) | | | |
| Time (hr) | 0.2 | 0.2 | 0.2 | 0.0 | 0.0 | 0.0 | STD* |
| −1.25 | 13.07 | 13.07 | 13.07 | 13.07 | 13.07 | 13.07 | 13.07 |
| −0.25 | | | | | | | |
| 0.00 | 9.92 | 9.92 | 9.92 | 9.92 | 9.92 | 9.92 | |
| 0.50 | 6.50 | 10.50 | 10.30 | 9.70 | 10.60 | 9.80 | |
| 1.00 | 2.80 | 9.40 | 10.30 | 8.50 | 9.75 | 9.95 | |
| 1.50 | 2.00 | 8.60 | 9.50 | 7.20 | 10.45 | 10.45 | |
| 1.90 | | | | | | | 12.95 |
| 2.25 | 1.90 | 8.20 | 10.70 | 6.90 | 9.00 | 10.00 | |
| 4.67 | 1.53 | 5.30 | 10.60 | 6.90 | 9.10 | 10.10 | |
| 19.83 | 1.62 | 1.65 | 9.60 | 8.50 | 8.90 | 9.20 | |
| 20.25 | | | | | | | 12.50 |

*Standard, the turbidity of untreated chromic anhydride. (The turbidity at time = 0.00 is an average of the measurements at 25° C. and 0.0 water.)

The above table shows that turbidity was markedly reduced when water was added and the temperature exceeded 66° C.

Further experiments showed that if the chromic anhydride was heated to 106° C. with no water added, the turbidity began to increase after about 24 hours, but no such increase occurred when 0.2 wt% water was added.

EXAMPLE 2

Example 1 was repeated using twelve 50 g chromic anhydride samples placed in jars positioned in random order and preheated for one hour at 106° C. Five minutes was required to sort the jars, add water, and put the samples in the correct place. All turbidities were measured after an hour and a half. The following table gives the results:

| % Water Added | NTU at 106° C. | NTU at 25° C. |
| --- | --- | --- |
| 0.40 | 1.50 | 7.80 |
| 0.20 | 1.90 | 9.10 |
| 0.10 | 2.00 | 9.20 |
| 0.02 | 5.60 | 8.60 |
| 0.01 | 7.10 | 9.10 |
| 0.00 | 6.00 | 8.80 |

The above table shows that at least 0.1% water was needed to substantially reduce the turbidity to 2.00 at a temperature of 106° C. for about 1½ hours, and that the turbidity was not significantly reduced at room temperature.

EXAMPLE 3

The effect of relative humidity on chromic anhydride was investigated by exposing samples of chromic anhydride to 0% relative humidity, 15 to 16% relative humidity, and 64 to 65% relative humidity. The relative humidity was controlled using ASTM E 104-85, "Standard Practice for Maintaining Constant Relative Humidity by Means of Aqueous Solution." One percent (by weight) solutions were formed by taking samples of the three test materials after various periods of time. Treatments with 0% relative humidity and 15 to 16% relative humidity had virtually no effect on turbidity even after forty days. However, treatment with 64 to 65% relative humidity resulted in a nearby linear turbidity decrease (calculated using regression analysis) of about 0.1 NTU/day for sixty days.

EXAMPLE 4

Chromic acid flake that had been preheated for one hour at 116° C. was placed into three jars; 0.1% by weight of water was added to two of the jars. The cap was placed on one of the two jars to which water had been added and all three jars were subsequently heated for 1½ hours; 1% solutions were then formed and the turbidity was measured. The following table gives the conditions and results:

| INITIAL NTU | NTU after 1 hour | H$_2$O Added(wt %) | Lid on? | NTU after 1.5 hrs |
| --- | --- | --- | --- | --- |
| 12.45 | 7.3 | 0.1 wt % | Yes | 2.55 |
| 12.4 | 7.1 | 0.1 wt % | No | 6.1 |
| 12.4 | 6.2 | 0 wt % | Yes | 6.0 |

The results indicate that the humid environment must be maintained for the entire 1½ hour period because when no water was added or the water was permitted to escape the reduction in turbidity did not occur.

EXAMPLE 5

Inside an oven was assembled a water trap, a bed in which could be placed various samples of chromic anhydride, and a flow constrictor. Water vapor or steam flowed through the water trap, which removed liquid water. The vapor or steam then entered the bottom of the bed and flowed up through the bed past glass wool into the flow constrictor, which could be used to increase the pressure of the water vapor or steam. The oven was operated at a 104° C. The following table gives the test configurations, initial turbidity, final turbidity, and the appearance of the resulting flake.

| | Test Configuration | Initial Turbidity (NTU) | Final Turbidity After 1 hour test (NTU) | Flake Appearance |
| --- | --- | --- | --- | --- |
| A | Boiling water at 240° F. thru bed of CrO$_3$ | 12.55 | 1.0 | No longer flake. Solid and crystalline. |
| B | Building steam superheated to 121° C. using condenser in oven. | 12.4 | 1.65 top 0.95 bottom | Top was flake, bottom was crystals. Bottom very caked. |
| C | Same as B, except steam at slightly elevated pressure. | 12.2 | 0.95 | Very dark purple, very caked. |
| D | Same as C, except used humidified air at 5 l/min | 12.2 | >200.0 initially, 6.0 after settling | High volume of reduced chrome. |
| E | Same as D, except added steam with 5 l/min | 12.2 | 6.2, top 6.5, bottom | Top flowed well, bottom was caked. |
| F | Same as D, except use gas washing bottle to humidify air. | 12.2 | 25 | Reduced chrome in flake. |
| G | Same as B, except superheat steam in 302° C. sand bath | 11.5 | 1.8, top 2.6, bottom | Top was free flowing flake, while bottom had dark caked crystals. |
| H | Same as G, except use high recirculating steam rate to avoid in-line condensation | 12.2 | 5.7, top 1.7, bottom | Bottom was a gummy caked mass. |
| I | Same as C, except use N$_2$ and superheat using sand bath. | 12.2 | 4.6, top 4.5, middle 7.7, bottom | Material was very caked. |
| J | Same as G, except use very low steam flow. | 12.2 | 1.4, top 1.2 0.95 1.1, bottom | The material was generally caked, some dark purple stuff on bottom. |

In the above table experiments G, H, I, and J are outside the scope of the invention because the temperature exceeded 196° C.: in these experiments the chromium was reduced. In tests D and F humidified air was not satisfactory because it also resulted in reduced chromium, probably due to the presence of reducing contaminates in the air; when humidified nitrogen was used no reduction of the chromium was observed. In test E air added to steam did not reduce the chromium, although some caking occurred.

We claim:

1. A method of reducing the turbidity of an aqueous solution of chromic acid prepared by dissolving melted chromic anhydride in water, comprising
   (A) adding water to said chromic anhydride in an amount of at least about 0.02 wt%, but insufficient to form a solution of said chromic anhydride;
   (B) heating said chromic anhydride above ambient temperature, but below about 196° C.; and
   (C) dissolving said chromic anhydride in water to form said solution.

2. A method according to claim 1 wherein the amount of water is about 0.05 to about 0.1 wt%.

3. A method according to claim 1 wherein said heating is at about 90° to about 120° C.

4. A method according to claim 1 wherein said chromic anhydride is prepared by the reaction of sodium dichromate with excess sulfuric acid in water.

5. A method according to claim 1 wherein said chromic anhydride is chromic anhydride that has been melted and dropped on a flaker roll to form a thin sheet that has been broken into flakes.

6. A method according to claim 5 wherein said flakes are about 0.1 cm thick and about 1 cm² in area.

7. A method according to claim 1 wherein said chromic anhydride is heated at about 106° C. for about 2 to about 3 hours.

8. A method according to claim 1 wherein said water is liquid water.

9. A method according to claim 1 wherein said water is water vapor.

10. A method according to claim 1 wherein said water is steam.

11. A method of making a low-turbidity aqueous solution of chromic acid comprising
    (A) melting chromic anhydride;
    (B) comminuting said melted chromic anhydride;
    (C) contacting said chromic anhydride with water in an amount in excess of 0.02 wt%, based on said chromic anhydride weight, but insufficient to form a solution of said chromic anhydride, at a temperature above ambient but below 196° C.; and
    (D) mixing said chromic anhydride with water to form said solution.

12. A method according to claim 11 wherein said water is steam.

13. A method according to claim 11 wherein said water is liquid water.

14. A method according to claim 11 wherein the amount of water is about 0.05 to about 0.1 wt%.

15. A method of making a low-turbidity aqueous solution of chromic acid comprising
    (A) reacting sodium dichromate with excess sulfuric acid in water to prepare chromic anhydride;
    (B) melting said chromic anhydride;
    (C) comminuting said melted chromic anhydride;
    (D) adding water to said chromic anhydride in an amount of at least about 0.02 wt%, based on the weight of said chromic anhydride, but insufficient to form a solution, at a temperature above ambient but below 196° C.; and
    (E) dissolving said chromic anhydride in water.

16. A method according to claim 15 wherein the amount of water is about 0.05 to about 0.1 wt%.

17. A method according to claim 15 wherein said temperature is about 90° to about 120° C.

18. A method according to claim 15 wherein said melted chromic anhydride is dropped onto a flaker roll to form a thin sheet which is subsequently broken into flakes.

19. A method according to claim 15 wherein said water is steam.

20. A method according to claim 1 wherein said water is liquid water.

* * * * *

UNITED STATES PATENT AND TRADEMARK OFFICE
CERTIFICATE OF CORRECTION

PATENT NO. : 5,034,211

DATED : July 23, 1991

INVENTOR(S) : Robert L. Zeller, III, et al

It is certified that error appears in the above-identified patent and that said Letters Patent is hereby corrected as shown below:

Title page, item [75] Inventors: change "Gilbert D. Rabbe" to --Gilbert O. Rabbe--.

Column 6, line 40, Claim 20, change "claim 1" to --claim 15--.

Signed and Sealed this

Twenty-seventh Day of October, 1992

Attest:

DOUGLAS B. COMER

*Attesting Officer*          *Acting Commissioner of Patents and Trademarks*